OPTICAL MEMORY WITH PHOTOACTIVE MEMORY ELEMENT

Filed June 16, 1967

INVENTORS: A.A. BALLMAN
P.V. LENZO
E.G. SPENCER

BY Charles Scott Phelan
ATTORNEY

United States Patent Office 3,518,634
Patented June 30, 1970

3,518,634

OPTICAL MEMORY WITH PHOTOACTIVE MEMORY ELEMENT

Albert A. Ballman, Woodbridge, Pascal V. Lenzo, Warren Township, Somerset County, and Edward G. Spencer, Berkeley Heights, N.J., assignors to Bell Telephone Laboratories, Incorporated, Murray Hill and Berkeley Heights, N.J., a corporation of New York Filed June 16, 1967, Ser. No. 646,635
Int. Cl. G11c *13/04*
U.S. Cl. 340—173 28 Claims

ABSTRACT OF THE DISCLOSURE

A body of bismuth geranium oxide in an electric field is flooded by monochromatic light, a narrow beam of multichromatic light is controllably deflected to strike selected regions of the body collinearly with the multichromatic light. The simultaneous application of electric field and multichromatic light enhances optical activity in the region of the body illuminated by such multichromatic light. The domain of enhanced optical activity produced by such coincidence persists after removal of the multichromatic light. Optical polarization filters in the path of the monochromatic light cooperate with domains of enhanced optical activity in the body of bismuth germanium oxide to produce on a detector a projection of the pattern of domains thus formed. Domains are erased by applying an intense multichromatic side light or by sharply reducing the electric field. Domain persistence is increased by a magnetic field perpendicular to the electric field. Ferroelectric enhancement of domain formation is also employed.

BACKGROUND OF THE INVENTION

Field of the invention

This invention relates to optical memories and it relates particularly to such memories which store information as a state of light transmission characteristic in predetermined locations of a memory material.

Prior art

Prior optical memories have employed various storage techniques including photographic film storage, thermoplastic film storage, and storage in optical transmission patterns in apertured cards. A common difficulty of all of the prior art memories is the well known inconvenience experienced in changing information storel therein. Such changes usually require operator intervention and are not convenient, for example, for rapidly changeable memory, often called scratch-pad memory, use in systems requiring high speed operation. Heretofore there was no readily changeable optical storage medium.

It is, therefore, one object of the present invention to improve techniques for the storage of information as a state of an optical transmission characteristic in a storage medium.

It is another object to store information in an optical memory that is readily changeable.

A further object is to store information in a manner that is optically controllable for writing into storage and reading out of storage and which produces an optical read-out.

STATEMENT OF THE INVENTION

The foregoing objects of the invention are realized in an illustrative embodiment in which the output of a first source of illumination is applied upon a body of material in the presence of an electric field to establish discrete domains of altered light transmission characteristic in regions where the light and field coincide. A second source of illumination which is not similarly cooperative with the electric field is applied to project the image of the established domain pattern on a detector. The coincidence of electric bias field and the first source of illumination is said to produce a photoactive effect in the illuminated material, and the effect is demonstrated by the results produced on illumination from the second source of illumination. This photoactive effect is considered in detail in the copending application Ser. No. 646,636 of A. A. Ballman, P. V. Lenzo and E. G. Spencer entitled "Photoactive Light Modifying Device" which is being filed on even date with the present application and assigned to the same assignee.

It is one feature of the present invntion that an established domain of altered light transmission characteristic persists for a significant time interval in the absence of the illumination employed to form such domain.

Another feature is that domain persistence is enhanced by applying a magnetic field in a direction which is perpendicular to the axis of the electric bias field.

A further feature is that domain contrast with respect to adjacent portions of the body of material is improved by ferroelectric enhancement.

Yet another feature is that the material is a photoconductive, optically active material, such as the semiconductor bismuth germanium oxide, $Bi_{12}GeO_{20}$.

DESCRIPTION OF THE DRAWING

A more complete understanding of the invention and its features, objects, and advantages may be obtained from a consideration of the following detailed description in conjunction with the appended claims and the attached drawing in which:

DETAILED DESCRIPTION

Figure 1:
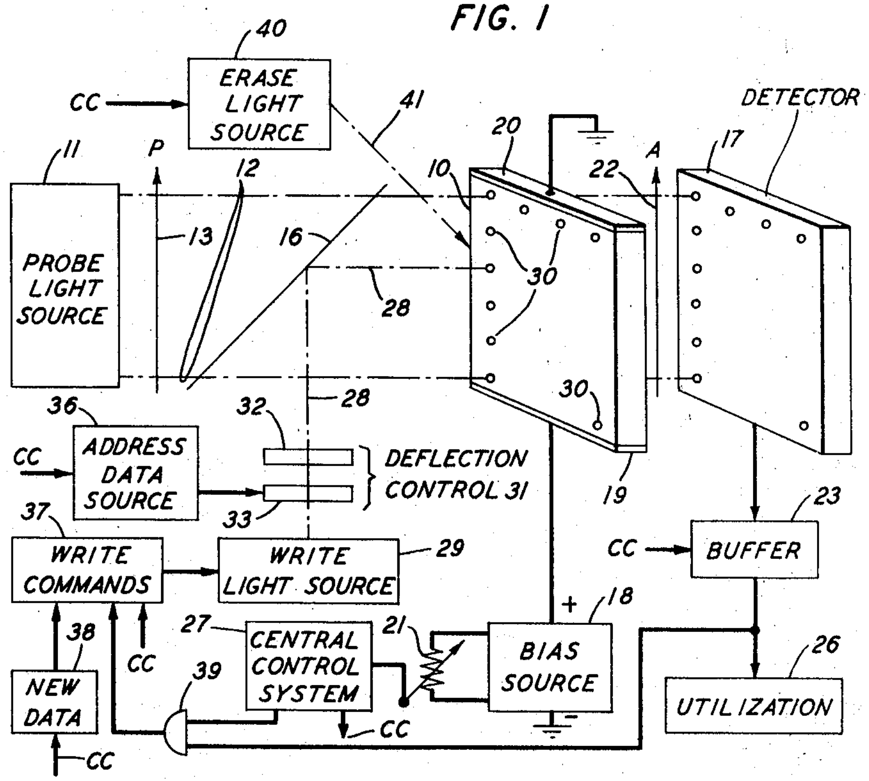
FIG. 1 is a simplified diagram, not drawn to scale, of an optical store utilizing the present invention.

In the store system of FIG. 1 a crystalline body hereinafter designated crystal 10 stores domains of altered light transmission characteritics which are generated by photoactivity. As described in detail in the aforementioned Ballman et al. application, the crystal 10 is a photoconductive material evidencing optical activity characteristics. Materials in the cubic point group 23 are in this category and also evidence electro-optic characteristics and piezoelectric characteristics. A specific example of a material of this type is the semicondnuctor bismuth germanium oxide. In one actual embodiment, the crystal of bismuth germanium oxide comprising the crystal 10 was about 1.55 millimeters in the vertical direction in the drawing, which direction also corresponded to either the 110 direction or the 001 direction of the crystal. The width of the crystal in the horizontal direction in the drawing, which was the principal direction of light propagation, was about 3.78 millimeters and coincided with the $\bar{1}10$ direction of the crystal. The depth of the crystal was about 1.78 millimeters. Bismuth germanium oxide suitable for the purposes of the present invention has been produced as outlined in an article "The Growth and Properties of Piezoelectric Bismuth Germanium Oxide $Bi_{12}GeO_{20}$" by A. A. Ballman and appearing at pages 37–40 of Journal of Crystal Growth, January 1967, published by North-Holland Publishing Company, Amsterdam, Netherlands. The same process is also the subject of the A. A. Ballman application Ser. No. 522,840, filed Jan. 25, 1966 now Patent No. 3,470,100.

It was described in the aforementioned Ballman et al. application that photoactive crystals of the type here under consideration respond under the coincident stimulus of an applied electric field and low intensity light in the absorption band of the material by increasing the optical activity of the crystal as evidenced by the apparent rotation of the plane of vibration of plane-polarized monochromatic light which is applied to the crystal in a direction perpendicular to the axis of the electric field. In the aforementioned application the photoactivity was illustrated by using a comparatively broad beam of low intensity light in the absorption band to establish a state of optical activity and a narrow probing beam of monochromatic light outside the absorption band to indicate the established state. In the present store system the comparative sizes of the corresponding beams which impinge upon the memory material are advantageously reversed in order to utilize the photoactive effect to generate discrete domains of enhanced optical activity that are retained in the crystal after the removal of the in-band light.

The period of domain retention realized in presently available materials is approximately one minute. However, such a domain is easily generated in a time interval of the order of a few milliseconds, including time required for accessing a particular location address, so that it is practical to store hundreds of domain states at different memory locations before a need arises to return to a previously established domain location and regenerate its state. This type of time relationship is ample for scratchpad memory applications in high speed store systems.

Returning to FIG. 1, a light source 11 supplies a broad monochromatic beam of light which is schematically represented by a pair of dash-dot lines 12. The beam 12 is passed from the source 11 through a light polarization filter such as the polarizer 13 which is schematically represented by a vertical arrow in FIG. 1. The portion of the beam 12 which is transmitted by the polarizer 13 is a plane-polarized light beam; and such beam is then transmitted through a half-silvered mirror 16, which serves a function to be described, to the crystal 10. The beam 12 has a wavelength outside the principal portion of the absorption band of the crystal 10. Thus, bismuth germanium oxide has an absorption band for wavelengths of electromagnetic energy in the range from 4,000 A. to 6,000 A. The beam 12 advantageously is a helium neon laser beam with a wavelength of 6,328 A. so that its wavelength is longer than those in the absorption band of the crystal 10. Consequently, the transmission of the beam 12 through the crystal 10 does not produce within the crystal a significant number of charge carriers, i.e., beam 12 does not significantly alter the optical characteristics of crystal 10. Some elliptical polarization is present in the emerging beam 12, but it has been found to be insufficient to require optical compensation. Such compensation can be readily applied by means well known in the art if it becomes necessary in some applications.

The intensity of beam 12 is not a critical parameter; and any intensity capable of being transmitted through the mirror 16, the crystal 10, and the wave polarization filtering means employed to a detector 17 is suitable. The beam 12 is shown in FIG. 1 in only two dimensions, but it is to be understood that this beam is of essentially the same cross section as the crystal 10 so that the beam 12 illuminates all information storage locations in the body. Beam 12 emerges from crystal 10 with whatever apparent rotation of its plane of vibration is produced by the natural optical activity of the crystalline material. Such rotation is a function of crystal thickness; and, as noted in the cited Ballman et al. application, it can be modified by an electric field and by light in the crystal absorption band.

The crystal 10 is located in an electric field which is established by a bias source 18 that has one terminal connected to ground and the other terminal connected through a contact 19, the crystal 10, and a further contact 20 to ground. Bias source 18 is advantageously a source of direct potential with its negative electrode connected to ground and its positive terminal connected to the contact 19. The terminal output voltage from source 18 is adjustable, as is schematically indicated by a variable resistor 21 connected to the source. Contacts 19 and 20 are ohmic contacts of an indium-mercury amalgam. Thus, the electric field established by source 18 in the crystal 10 is substantially uniform throughout any cross section of the crystal which is perpendicular to the axis of the electric field extending between contacts 19 and 20. The magnitude of the bias source output voltage affects the contrast of domains of altered optical activity in the crystal 10. In an embodiment such as that shown in FIG. 1 a terminal voltage of approximately 2,500 volts is adavntageously employed. Higher voltages can be used to obtain sharper contrast up to the limit of voltages that are of sufficient magnitude to cause significant deflection of light by electro-optic refraction. Such refraction is typically produced at voltages of about 4,000 to 5,000 volts.

The broad light beam 12, after transmission through the crystal 10, is coupled through a further polarization filter, such as the analyzer 22, to the detector 17. Analyzer 22 is initially positioned so that its polarization transmission orientation complements the polarization transmission orientation of the polarizer 13 and the optical activity effect of the crystal 10 to produce a predetermined intensity level of the transmitted light beam 12 at detector 17. For example, the analyzer is conveniently adjusted to produce maximum illumination intensity at detector 17 in the absence of any information stored in the crystal 10. The analyzer detects the orientation of the plane of vibration of light received from the crystal 10 and produces output illumination to the detector 17 with an intensity which is a function of such orientation.

Detector 17 is any suitable device, and the human eye aided by suitable magnification have been used. A photoconductive device which is responsive to different illumination intensities for producing electric output signals of corresponding magnitudes is preferred for memory system applications. The detector is advantageously a mosaic of such photoconductive devices, each corresponding to a different predetermined information storage location in the body 10 and in registration with such storage location to receive portions of the beam 12 that are transmitted through such location to the detector 17. Detectors of this type are well known in the art and advantageously include electric circuit coupling means (not specifically shown) for communicating the aforementioned electric signals for the respective detector locations to suitable electric circuits such as a buffer register 23.

Register 23 has a plurality of stages corresponding to respective information bit positions of at least one word of the memory crystal 10. Also included in the detecting arrangement, of course, are scanning circuits for coupling to the buffer register 23 outputs from different word locations of the detector 17 in embodiments where the buffer register can accommodate only one word at a time. Output signals from buffer register 23 are coupled to a utilization circuit 26 which may, for example, be a memory access register of a central processor (not shown) in a stored program data processing system which is schematically indicated by a central control system 27.

Optical activity of selected locations in the crystal 10 is enhanced by a variable-intensity, deflectable writing light beam 28 which is schematically represented by a correspondingly designated broken line in FIG. 1. There are many ways known in the art for supplying and controlling a narrow light beam such as the beam 28. One such technique is by means of a cathode ray tube with its electromagnetically deflectable electron beam for producnig a correspondingly moveable spot of light on the electroluminescent screen of the tube. By other techniques known in the art noncoherent light can be focused into a narrow beam and controllably deflected, and these are primarily electromechanical techniques. In a preferred embodiment beam 28 is advantageously a coherent light beam and is controllably deflected by electro-optic deflection means. One electro-optic deflection arrangement is shown in the J. E. Geusic et al. Pat. 3,290,619, and others are known in the art.

The beam 28 is supplied by light source 29, and the beam has a cross-sectional diameter corresponding to the cross-sectional diameter of an information bit storage location 30 in the crystal 10. It is noted at this point that the spacing of storage locations such as the locations 30 in the crystal 10 must be such as to prevent intersymbol interference between adjacent locations. Suitable spacing was realized in one actual embodiment wherein intervening unused material of the crystal 10 between storage locations was equal to a full diameter of a storage location. Such spacing was not a limit. Source 29 includes any appropriate optics, although not specifically shown, for focusing beam 28 into a narrow column of light. The beam includes at least some electromagnetic energy components with wavelengths in the absorption band of the material comprising crystal 10, and a beam of appropriate intensity and wavelength is advantageously provided by employing in the source 29 an argon ion laser having a wavelength of 4,500 A. The output intensity of such a laser is readily controllable by means known in the art and is selected to provide a desired contrast between storage locations in the crystal 10 and the adjacent crystal material. Thus, this factor of contrast is affected both by the intensity of the light provided from the source 29 and by the intensity of the electric field imposed upon the crystal 10 as previously described.

Beam 28 is transmitted through beam deflection control apparatus 31 which advantageously comprises a chain of electrically controllable stages, each of which includes an electro-optic switch and a birefringent element. The chain is schematically represented in FIG. 1 by a single electro-optic switching device 32 and a birefringent device 33. The indicated devices deflect the beam 28 in accordance with a two-dimensional orthogonal coordinate system so that the beam may thereby be scanned to impinge upon the various storage locations of the crystal 10. Deflection control signals from an address data source 36 provide appropriate bias to the device 32. An input connection CC to the address data source 36 schematically represents control of such source flowing from the central control system 27. The mirror 16 is schematically represented by a diagonal line in FIG. 1, and in actuality it comprises a half-silvered mirror of sufficient area when arranged on the diagonal shown to reflect the beam 28 from its initially generated orientation in parallel with the electric field in the crystal 10 to an orientation which is collinear with the axis of the beam 12. Mirror 16 transmits the beam 28, when properly previously deflected, to any of the plural storage locations in the crystal 10.

Each of the storage locations 30 is schematically represented as a circle on the left-hand face of the crystal 10 to indicate the essentially cylindrical path of the same diameter which the beam 28 takes at it is transmitted, in its collinear alignment with the beam 12. At the bismuth germanium oxide crystal 10 the coincidence at a storage location 30 of the writing beam 28 with the electric field produced by the bias source 18 changes the optical activity of the cylindrical portion of the body subjected to such coincident effects. Such change in the optical activity rotates the plane of vibration of the portion of the monochromatic light beam 12 which is also transmitted through such storage location. Consequently, that same portion of beam 12 which is further transmitted through the analyzer 22 to the detector 17 is reduced in intensity at the detector 17 by an amount corresponding to the aforementioned change in optical activity at the selected storage location.

The described rotational capability of the portion of crystal 10 in such a selected storage location is retained by the crystal 10 in that location after the beam 28 is gated off in a fashion which will be described. Without intending any limitation upon the scope of the invention, one possible explanation of this retention of a nucleated domain is offered. Thus, it is believed that charge carriers are generated in the selected storage location by the writing beam 28. These carriers move, under the influence of the electric field established by the bias source 18, toward the upper and lower edge elements of the cylindrical storage location 30 in accordance with the respective polarities of such carriers and of the bias source 18. Thus, positively charged carriers move toward the edge of the storage location which is closest to the contact 20 and negatively charged carriers move toward the edge of the storage location which is closest to the positive contact 19. Upon reaching the respective edges of the storage location there is no further migration of the charge carriers because of the relatively higher resistivity of the bismuth germanium oxide beyond the edge of the location illuminated by the beam 28. For example, bismuth germanium oxide has a resistivity of the order of $10^{10}$ ohm-centimeters in the absence of illumination in the absorption band of the material, but the resistivity drops by two or three orders of magnitude in the presence of such illumination.

The described charge carrier migraton is believed to distort the crystalline structure of the material in the crystal 10 and thereby produce the enhanced optical activity in the region so distorted. When the writing beam 28 is gated off, the charge carriers are essentially trapped at their new locations thereby storing the new state of enhanced optical activity in the selected storage location. The charges are thus trapped because the removal of the writing beam restores the storage location to its high resistivity state, and in that state the carrier mobility is drastically reduced.

The period of charge carrier retentivity is partially a function of the specific material of the crystal 10 and of its geometry. However, periods of approximately one minute have been readily achieved in bismuth germanium oxide crystals of the dimensions previously outlined.

It was heretofore noted that the beam 28 is gated off and on. It is, of course, possible to deflect the beam 28 while it is on, but this would result in a corresponding shift in the position of the nucleated domain of enhanced optical activity. For the memory write-in application it has been found to be advantageous to maintain such domain storage locations in a stable position, and this stability is achieved by establishing the condition for a beam deflection in the absence of the beam.

Beam 28 is conveniently gated off and on by appropriate known light gating or shuttering mechanisms operated under the control of write commands from a write command signal source 37. Thus, when the central control system 27 initiates a write-in operation, it applies signals over the circuits CC to the address data source 36 for establishing appropriate beam deflection conditions in the deflection control 31. Immediately thereafter central control system 27 similarly actuates the write command source 37 to gate the probe light source 29 for turning on the beam 28. The coincidence of beam 28 and the electric field nucleates a domain of enhanced optical activity as previously described. At the end of a fixed write-in interval the central control signals on the circuit CC cause the write command source 37 to gate the beam 28 off.

Each new write-in operation for a different storage location 30 in the crystal 10 is carried out in a similar manner, i.e., by addressing the memory through the address data source 36 and deflection control 31 and then gating beam 28 on and off successively through operation of the write command source 37. New information for this type of write-in operation is provided from a new data source 38 which is also under the coordinated control of the central control system 27. The new data source 38 determines whether or not the beam 28 will be gated on for each particular storage location that is addressed.

It has been previously indicated that in some systems it will be necessary periodically to regenerate the information stored in the memory crystal 10. For this purpose the program in the central control system 27 at such periodic intervals causes the buffer register 23 to store the contents of successive words of information in crystal 10. After each such successive registration, central control system 27 opens a gate 39 which couples such information in bit series fashion for the illustrated embodiment to the write command source 37. The latter source controls the writing beam 28 in the manner previously outlined for each of the corresponding successive addresses, which are also provided by the central control system 27 to the address data source 36.

Read-out from the memory comprising the crystal 10 is continuously available because the monochromatic probing light source 11 is continuously operative, for simultaneously projecting on to the light receiving surfaces of detector 17 illumination intensities corresponding to the respective optical activity states of the various storage locations 30 in the crystal 10. Since the storage of information in the crystal 10 is not dependent upon the presence or absence of illumination from the source 11, the store can be conveniently enlarged by inserting additional deflection control apparatus (not shown) in the path of the beam 12 between the mirror 16 and the crystal 10 for deflecting the beam 12 to other information storing bodies (not shown) of the same type as the crystal 10 which is shown.

As in all memories, it is necessary in the memory of the store system in FIG. 1 to provide means for erasing information stored therein. This is particularly true where the store system is to operate on a scratch-pad basis. In order to accomplish single bit erase operations, central control system 27 operates on the adjustable resistor 21 for sharply reducing the terminal voltage on the bias source 18. A complete bias turn-off can be used. Address signals for the bit to be erased are supplied to address data source 36 for establishing the proper deflection bias on the electro-optic deflection device 32. Under these conditions write command source 37 is actuated to gate the writing beam 28 on and off. When the beam strikes the addressed one of the locations 30 in the memory crystal 10 the resistivity of the illuminated portion of the body is reduced, and the charge carriers therein migrate rapidly back to their natural equilibrium condition. After extinguishing the beam 28, the central control system 27 restores bias source 18 to the normal output voltage. No bit locations other than the one just addressed are significantly affected because they remain in their high resistivity state. The removal of the large bias voltage from the nonaddressed locations of crystal 10 permits the charge carriers to migrate, but the high resistivity of the crystal material impedes such migration so that there is no significant change in the information stored at memory locations that are not addressed by the beam 28.

The described single-bit erase technique is, of course, extendible to multibit operation. For example, to erase a word the relevant adjacent bit locations are scanned by beam 28 while the bias is at reduced level.

The entire memory can be erased in a single operation by flooding it with intense light in the absorption band of the bismuth germanium oxide crystal 10. Such an erasing light is provided, under the control of the central control system 27, by an erase light source 40 which produces a beam 41 of white light of sufficient intensity to create enough charge carriers to restore domain natural equilibrium in the allotted erase time. The source 40 is oriented so that the beam 41 penetrates to the full extent of every storage location 30 in the crystal 10. The intense light generates charge carriers substantially uniformly throughout the crystal 10; and since the bias is present optical activity is enhanced throughout the crystal body so that charge carriers can assume a substantially uniform distribution throughout the crystal 10. Such carriers can then move freely to the crystal contacts and are no longer trapped.

During the time of application of the beam 41 central control system 27 blocks input connections to buffer 23 to prevent disturbance of information that may be present therein by the miscellaneous changes in ouput signals from detector 17 which result from the transmission of the beam 12 through the full crystal 10 with its enhanced optical activity. At the end of the erase operation the central control system gates erase light source 40 off, releases the input connections to buffer 23, and begins the operation of writing new data into the memory crystal 10 in the manner previously described.

Figure 3:
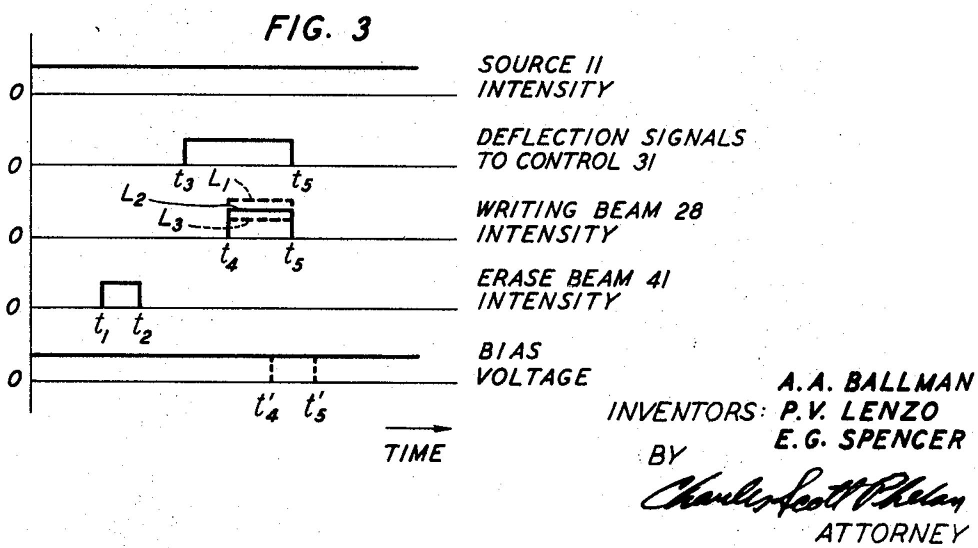
FIG. 3 is a timing diagram illustrating the operation of the store of FIG. 1.

The timing diagram in FIG. 3 shows the relationships of various ones of the significant operations hereinbefore described. Thus, the output intensity of the monochromatic light source 11 remains uniform throughout memory operation. At time $t_1$ an erase operation is begun by raising the erase beam 41 to full intensity as previously described. At time $t_2$ the erase light is extinguished. At the subsequent time $t_3$, deflection signals are applied to the deflection control 31 for addressing a particular storage location 30 in the crystal 10. During the persistence of these deflection signals and at the subsequent time $t_4$, the beam 28 is turned on for enhancing optical activity at the selected storage location to initiate the change in the optical transmission state of such location. After completion of such change at a time $t_5$, beam 28 is turned off and deflection signals are removed from the deflection control 31. Other write-in operations (not shown in FIG. 3) such as that illustrated between the times $t_3$ and $t_5$ in FIG. 3 are accomplished to write new information into other selected storage locations of the memory. A single-bit erase operation involves essentially the same control of the deflection control 31 and of the beam 28 as are illustrated between the times $t_3$ and $t_5$; but, in addition, the output voltage of bias source 18 is sharply reduced through a time interval extending approximately from a time $t_4'$ to a time $t_5'$, which interval overlaps the turn-off time $t_5$ of beam 28.

The embodiment of FIG. 1 has hereinbefore been described in terms of a binary information representation at each storage location in the crystal 10. That is, it has been described in terms of writing operations in which the beam 28 is either off or on. It will be apparent to those skilled in the art, however, that write command source 37 can also include logic circuits of a type well known in the art for controlling the intensity of the beam 28 to have any one of a plurality of different intensity levels when the beam 28 is on. Such control is schematically represented by the writing beam intensity levels L1, L2, and L3 in FIG. 3. Thus, the optical activity at an addressed storage location 30 can have any corresponding one of different optical activity levels, and the resulting signals provided by detector 17 to buffer 23 likewise have correspondingly different magnitude levels.

Figure 2:
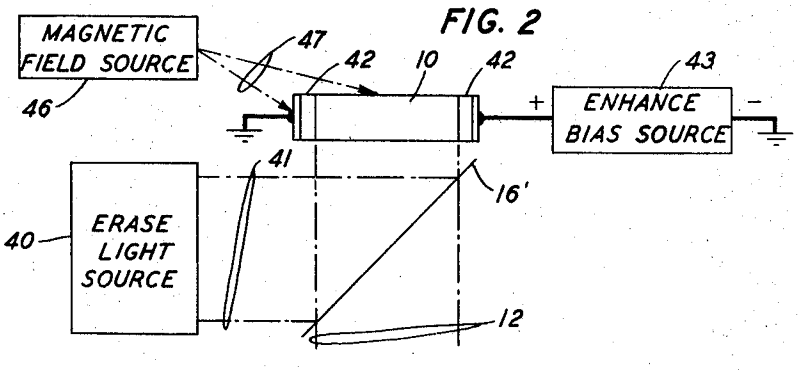
FIG. 2 is a diagram of a modified portion of the store in FIG. 1.

The crystal 10 is shown in top view in FIG. 2 with the contact 20 removed. This view shows a different orientation of the light source 40 to permit ferroelectric enhancement of domain formation and still permit beam 41 to penetrate each storage location part of the crystal 10. Beam 41 is initially projected perpendicularly to beam 12. It is then reflected by another half-silvered mirror 16' so that beam 41 is applied to crystal 10 colinearly with beam 12. Mirror 16' is further oriented to transmit probing beam 12 and to transmit beam 28 when it appears.

Also shown in FIG. 2 is one means for providing ferroelectric enhancement to improve formation of and the contrast of nucleated domain storage locations in the memory crystal 10. For this purpose ferroelectric crystals 42, such as crystals of barium titanate, are placed adjacent to opposite edges of the crystal 10 along a line which is parallel to the axis of application of the electric field produced by the bias source 18. Crystals 42 are placed in contact with the crystal 10, and they are in electrical contact with the output of an enhancing bias source 43 by means of ohmic contacts of the same type as the contacts 19 and 20 in FIG. 1. Bias source 43 is advantageously arranged across a series path including crystals 42, memory crystal 10, and ground. The output voltage of the source 43 must be adequate to pole the crystals 42 in one of their two stable charge states.

As indicated in the aforementioned Ballman et al. application, ferroelectric enhancement permits the reduction of output voltage from bias source 18 to approximately 60 volts when one mil thick crystals 42 are biased with a voltage from source 43 of approximately 20 volts. The ferroelectric enhancement not only improves the contrast of nucleated storage domains in the bismuth germanium oxide crystal 10, but it also increases the memory response speed by increasing charge carrier mobility in the crystal 10 to facilitate the formation and erasure of domains of enhanced optical activity. The enhancement arises from the fact that smaller voltage is required from source 18, and variations to achieve desired conditions are, therefore, more easily realized. Similar enhancement can also be produced by poling a single ferroelectric crystal in a separate circuit and then manually placing it in contact with one edge of crystal 10 in lieu of crystals 42 and source 43.

A further modification of the invention is also shown in FIG. 2 and may be used independently of or in conjunction with ferroelectric enhancement. This additional feature is magnetic enhancement of the memory retentivity characteristic. It has been found that when crystal 10 is arranged in a magnetic field which penetrates the crystal on an axis that is perpendicular to the axis of the application of the electric field therein, the time during which domains of enhanced optical activity are retained can be increased by a factor of about three. Such a magnetic field is conveniently provided, for example, by arranging a permanent magnet, or its equivalent, with poles adjacent to diagonally opposite vertical edges of the bismuth germanium oxide crystal 10 in the orientation shown in FIG. 1. Such a magnetic field arrangement is schematically indicated by a magnetic field source 46 in FIG. 2, and the field emanating therefrom is schematically indicated by the broken line arrows 47 in FIG. 2. All orientations perpendicular to the axis of the electric field work satisfactorily.

One magnetic field usefully employed in the manner described to increase retentivity by a factor of three had a field intensity of about 1000 oersteds. Increasing field intensity tends to increase memory retentivity. The extent of increase in retentivity depends upon the crystal body material, and the geometry of the body. Magnetic enhancement is easily employed in conjunction with ferroelectric enhancement because the magnetic field 47 is neither shaded nor distorted by the crystals 42 or their associated ohmic contacts.

It is believed that the interaction between the electric and magnetic fields in the magnetic enhancement concentrates more charge carriers near the edge elements of the cylindrical storage locations 30 during the write-in operation. This represents a greater average charge carrier displacement, and also the increased carrier path length in the presence of the magnetic field requires a longer time for the displaced carriers to migrate back to their natural equilibrium state. The magnetic enhancement has been found to affect all storage locations in the crystal body 10 in essentially the same manner even though ferroelectric enhancement is employed.

Although the invention has been described in terms of particular embodiments and modifications thereof, it is to be understood that additional embodiments and modifications which will be obvious to those skilled in the art are included within the spirit and scope of the invention.

What is claimed is:

1. In combination:
a body of optically active light transmitting material,
means altering optical activity characteristics of a plurality of selectable locations of said body by increasing the mobility of charge carriers in selected locations of said body, said altering means including
means applying an electric field to said body to influence movement of said carriers, and
means indicating the state of the optical activity characteristic of each said location of said body.

2. In combination:
a body of optically active light transmitting material,
means altering optical activity characteristics of a plurality of selectable locations of said body,
means indicating the state of the optical activity characteristic of each said location of said body, and
a source of light having an output component in the absorption band of said body illuminating all of said locations to establish substantially uniform light transmission characteristics throughout said body.

3. In combination:
a body of optically active light transmitting material,
means altering optical activity characteristics of a plurality of selectable locations of said body,
means indicating the state of the optical activity characteristic of each said location of said body, and
means, independent of said altering and indicating means, enhancing the retentivity of altered characteristics of selected ones of said locations, said enhancing means comprising means applying a magnetic field to said body.

4. In combination:
a body of photoactive light transmitting material,
means altering photoactivity characteristics of a plurality of selectable locations of said body, and
means indicating the state of photoactivity of each said location of said body.

5. In combination:
a body of photoconductive, optically active, light transmitting material,
means altering optical activity characteristics of a plurality of selectable locations of said body, and
means indicating the state of the optical activity characteristic of each said location of said body.

6. In combination:
a body of optically active light transmitting material, the material of said body being a crystalline material in the cubic point group 23,
means altering optical activity characteristics of a plurality of selectable locations of said body, and
means indicating the state of the optical activity characteristic of each said location of said body.

7. In combination:
a body of bismuth germanium oxide, said body further being an optically active light transmitting material,
means altering optical activity characteristics of a plurality of selectable locations of said body, and
means indicating the state of the optical activity characteristic of each said location of said body.

8. In combination:
a body of optically active light transmitting material,
means altering optical activity characteristics of a plurality of selectable locations of said body, said altering means comprising:
means applying an electric field in a first direction across said body,
means applying a deflectable light beam to said body along an axis which is perpendicular to said first direction, and means deflecting said beam to impinge upon different selectable ones of said locations, and means indicating the state of the optical activity characteristics of each said location of said body.

9. In combination:

a body of light transmitting material, means altering light transmission characteristics of a plurality of selectable locations of said body, said altering means comprising:

means applying an electric field in a first direction across said body, means applying a deflectable light beam to said body along an axis which is perpendicular to said first direction, and means deflecting said beam to impinge upon different selectable ones of said locations, means indicating the state of the light transmission characteristic of each said location of said body, and means applying a magnetic field to said body in a direction which is perpendicular to said first direction, said field being substantially uniform throughout said body.

10. The combination in accordance with claim 8 in which:

said body is a crystalline material, and said electric field is applied along the 001 crystalline direction of said material.

11. The combination in accordance with claim 8 in which:

said body is a crystalline material, and said electric field is applied along the 110 crystalline direction of said material.

12. In combination:

a body of light transmitting material, means altering light transmission characteristics of a plurality of selectable locations of said body, said altering means comprising:

means applying an electric field in a first direction across said body, said electric field applying means imposing an electric field which is substantially uniform throughout each cross section of said body perpendicular to said first direction, and said electric field being of sufficient magnitude to influence current carriers throughout said body but of insufficient magnitude for effecting substantial electro-optic deflection of light transmitted through said body, means applying a deflectable light beam to said body along an axis which is perpendicular to said first direction, and means deflecting said beam to impinge upon different selectable ones of said locations, and means indicating the state of the light transmission characteristic of each said location of said body.

13. The combination in accordance with claim 8 which comprises in addition, means varying the intensity of said electric field for effecting different discrete levels of change in the light transmission characteristics of said body.

14. In combination:

a body of light transmitting material, means altering light transmission characteristics of a plurality of selectable locations of said body, said altering means comprising:

means applying an electric field in a first direction across said body, means applying a deflectable light beam to said body along an axis which is perpendicular to said first direction, and means deflecting said beam to impinge upon different selectable ones of said locations, means indicating the state of the light transmission characteristic of each said location of said body, and at least one poled ferroelectric member in electrical contact with said body and extending along said body in a direction which is parallel to said first direction of said electric field.

15. In combination:

a body of light transmitting materal having a predetermined absorption band, means altering light transmission characteristics of a plurality of selectable locations of said body, said altering means comprising:

means applying an electric field in a first direction across said body, means applying a deflectable light beam to said body along an axis which is perpendicular to said first direction, said beam including at least a light energy component having a frequency in the absorption band of said body, and means deflecting said beam to impinge upon different selectable ones of said locations, and means indicating the state of the light transmission characteristic of each said location of said body.

16. The combination in accordance with claim 8 in which, means control the intensity of said beam to effect different discrete levels of change in the light transmitting characteristics of said selected locations.

17. In combination:

a body of light transmitting material, means altering light transmission characteristics of a plurality of selectable locations of said body, said altering means comprising:

means applying an electric field in a first direction across said body, means applying a deflectable light beam to said body along an axis which is perpendicular to said first direction, means controlling the intensity of said beam to effect different discrete levels of change in the light transmitting characteristics of said selected locations, and means deflecting said beam to impinge upon different selectable ones of said locations, means indicating the state of the light transmission characteristic of each said location of said body, said indicating means comprising means applying a further light for transmission through said body, means detecting at least one characteristic of said further light after transmission through each of said locations of said body, and means selectably coupling said detecting means to control said intensity controlling means for regenerating light transmission states in said selected locations.

18. In combination:

a body of light transmitting material, means altering light transmission characteristics of a plurality of selectable locations of said body, said altering means comprising:

means applying an electric field in a first direction across said body, means applying a deflectable light beam to said body along an axis which is perpendicular to said first direction, and means deflecting said beam to impinge upon different selectable ones of said locations, means indicating the state of the light transmission characteristic of each said location of said body, said indicating means comprising an indicating beam of light for transmission through said body at a plurality of said locations simultaneously, said deflectable beam impinging on only one of said locations at a time, said deflectable beam and said indicating beam being applied along parallel axes at said body, and said body has an absorption band which includes a wavelength of said deflectable beam and does not include wavelengths of said indicating beam.

19. The combination in accordance with claim 8 in which said beam applying means comprises:
means projecting said beam in a direction which is perpendicular to said axis, and
reflecting means directing said beam from the last-mentioned perpendicular direction into a direction which is collinear with said axis.

20. The combination in accordance with claim 19 which comprises in addition indicating means including means applying light for transmission through said reflecting means and through said body.

21. The combination in accordance with claim 20 in which said reflecting means comprises a half-silvered mirror oriented to transmit light from said light applying means and to reflect said beam.

22. The combination in accordance with claim 8 in which said deflecting means comprises:
electro-optic deflecting means in the path of said beam for deflecting such beam along orthogonal coordinates perpendicular to the direction of such beam,
means controllably biasing said electro-optic deflecting means to alter the path of said probing beam to impinge upon different ones of said selectable locations of said material.

23. The combination in accordance with claim 1 in which said altering means comprises:
means applying an electric field in a first direction across said body,
means applying a light beam to said body along an axis which is perpendicular to said first direction and in time coincidence with said field to establish a predetermined state of said characteristic,
means terminating the application of said light beam, and
means reducing the intensity of said field for a predetermined time interval overlapping the termination of said light beam for erasing said predetermined state.

24. The combination in accordance with claim 1 in which said indicating means comprises:
means applying light for transmission through said body, and
means detecting at least one predetermined characteristic of said light after transmission through each of said locations of said body.

25. The combination in accordance with claim 24 in which light from said light applying means is in the form of a beam simultaneously illuminating all of said locations of said body.

26. The combination in accordance with claim 24 in which:
said light applying means is a source of plane-polarized light, said body effects rotation of the plane of vibration of said plane-polarized light,
means translating the orientation of the plane of vibration of said plane-polarized light, after transmission through said body, to a light signal of intensity corresponding to said orientation, and
means separately detecting the intensity of light transmitted through said translating means from each location of said body.

27. The combination in accordance with claim 26 in which said source of plane-polarized light includes:
means providing essentially monochromatic light,
polarization filtering means oriented to pass to said body primarily light having a single predetermined plane of vibration from said light providing means, and
said monochromatic light has a wavelength outside the range of wavelengths to which said body is responsive in its absorption band.

28. In combination:
a body of optically active material,
means for applying to at least one predetermined location of said material a beam of light including a component with a wavelength in the absorption band of said material,
means for applying an electric field to said material, and
means actuating said light beam and electric field applying means in coincidence to store information at any location where their effects coincide and further actuating said light beam applying means in the absence of said electric field to erase said information.

References Cited

UNITED STATES PATENTS

| | | | |
|---|---|---|---|
| 3,153,146 | 10/1964 | Lady | 350—150 X |
| 3,059,538 | 10/1962 | Sherwood | 350—150 X |
| 3,304,428 | 2/1967 | Peters | 350—150 X |
| 3,383,664 | 5/1968 | Chen | 340—173 |
| 3,393,955 | 7/1968 | Sterzer | 350—150 |

OTHER REFERENCES

Fleisher: Radiation Controlled Radiation Gate, IBM Technical Disclosure Bulletin, vol. 6, No. 3, August 1963, pp. 73–40.

Buhrer: Electrooptic Effect in Optically Active Crystals, Applied Optics, vol. 3, No. 4, April 1964, pp. 517–521.

TERRELL W. FEARS, Primary Examiner

H. L. BERNSTEIN, Assistant Examiner

U.S. Cl. X.R.

350—150, 160